US012626617B2

(12) United States Patent
Park

(10) Patent No.: US 12,626,617 B2
(45) Date of Patent: May 12, 2026

(54) LABEL APPARATUS FOR PEG HOOK

(71) Applicant: SOLUM CO., LTD., Yongin-si (KR)

(72) Inventor: Sang Baek Park, Yongin-si (KR)

(73) Assignee: SOLUM CO., LTD., Yongin-si (KR)

( * ) Notice: Subject to any disclaimer, the term of this patent is extended or adjusted under 35 U.S.C. 154(b) by 225 days.

(21) Appl. No.: 18/156,224

(22) Filed: Jan. 18, 2023

(65) Prior Publication Data

US 2023/0298487 A1 Sep. 21, 2023

(30) Foreign Application Priority Data

Jan. 21, 2022 (KR) ........................ 10-2022-0009545
Dec. 6, 2022 (KR) ........................ 10-2022-0168834

(51) Int. Cl.

| | |
|---|---|
| ***G09F 3/00*** | (2006.01) |
| ***G09F 3/16*** | (2006.01) |
| ***G09F 3/20*** | (2006.01) |
| *A47F 5/08* | (2006.01) |

(52) U.S. Cl.
CPC ................ *G09F 3/16* (2013.01); *G09F 3/204* (2013.01); *G09F 3/208* (2013.01); *A47F 5/0869* (2013.01)

(58) Field of Classification Search
CPC ............ G09F 3/16; G09F 3/204; G09F 3/208; G09F 23/06; A47F 5/0869
See application file for complete search history.

(56) References Cited

U.S. PATENT DOCUMENTS

| | | | | |
|---|---|---|---|---|
| 5,946,839 A * | 9/1999 | Odmark | A47F 5/0869 24/3.12 |
| 2005/0167555 A1 | 8/2005 | Wamsley | |
| 2007/0051816 A1* | 3/2007 | Chu | G09F 9/30 235/492 |
| 2007/0224879 A1 | 9/2007 | Beilenhoff et al. | |
| 2021/0097897 A1 | 4/2021 | Sisko et al. | |
| 2021/0365653 A1* | 11/2021 | Feng | G09F 9/372 |
| 2022/0036768 A1* | 2/2022 | Cho | G09F 9/30 |
| 2022/0036769 A1* | 2/2022 | Cho | G09F 3/208 |

FOREIGN PATENT DOCUMENTS

| | | |
|---|---|---|
| EP | 0870293 A1 | 5/1996 |
| JP | 2009053693 A | 3/2009 |
| KR | 20070034991 A | 3/2007 |
| KR | 20110045963 A | 5/2011 |
| KR | 2016-0086247 A | 7/2016 |
| KR | 102090174 B1 | 5/2020 |

OTHER PUBLICATIONS

European Search Report corresponding to counterpart patent application EP 23152183.2 issued Jun. 19, 2023, by the European Patent Office (EPO).

* cited by examiner

*Primary Examiner* — Cassandra Davis
(74) *Attorney, Agent, or Firm* — Renner, Otto, Boisselle & Sklar, LLP

(57) ABSTRACT

A label apparatus for a peg hook includes a body including a display unit displaying product information and a holder detachably provided at one end of the body and including a first engaging portion and a second engaging portion in which one end portions are rotatably connected to each other and the other end portions are attached to each other so that a catching hole is formed therebetween.

17 Claims, 10 Drawing Sheets

LABEL APPARATUS FOR PEG HOOK

CROSS-REFERENCE TO RELATED APPLICATION

This application claims benefit of priority to Korean Patent Application No. 10-2022-0009545 filed on Jan. 21, 2022 and Korean Patent Application No. 10-2022-0168834 filed on Dec. 6, 2022 in the Korean Intellectual Property Office, the disclosure of which is incorporated herein by reference in its entirety.

BACKGROUND

1. Field

The present disclosure relates to a label apparatus for a peg hook in which product information is displayed while hanging on a peg-hook.

2. Description of Related Art

In a store that sells various types of products in large quantities, such as a department store or a large mart, numerous product display stands are installed, in which various products organized by type are displayed and sold.

In addition, labels on which information, such as the name and price of the corresponding products, are recorded may be attached to the front of product display stands where respective products are displayed, so that consumers may purchase a desired product.

Recently, an electronic shelf label (ESL) has been introduced, and prices and information on various products are managed and displayed through an electronic control device.

However, when the ESL is installed on a peg hook, which is a cantilever-type hanger, it is not easy to hang or remove products on or from the peg hook due to an interference of the ESL.

SUMMARY

An aspect of the present disclosure may provide a label apparatus for a peg hook configured so as not to interfere with an operation of hanging a product on a peg hook or removing a product from the peg hook.

According to an aspect of the present disclosure, a label apparatus for a peg hook includes: a body including a display unit displaying product information; and a holder detachably provided at one end of the body and including a first engaging portion and a second engaging portion in which one end portions are rotatably connected to each other and the other end portions are attached to each other so that a catching hole is formed therebetween.

The body may have a fastening hole formed in the one end portion, and the first engaging portion includes two first clamping portions detachably insertedly fixed to the fastening hole and spaced apart from each other.

A length of the first clamping portion in a direction of insertion with respect to the fastening hole may be longer than a through-length of the fastening hole, the first clamping portion may have a first engaging end formed to be relatively thick outwardly at an end portion, and the first engaging end may be tapered toward an end.

An assembly hole may be formed between the two first clamping portions, and the second engaging portion may be formed with two second clamping portions spaced apart from each other and detachably insertedly fixed to the assembly hole.

A length of the second clamping portion in the insertion direction with respect to the assembly hole may be longer than a through-length of the assembly hole, the second clamping portion may have a second engaging end formed to be relatively thick outwardly at an end portion, and the second engaging end may be tapered toward an end.

The first engaging portion may include a first reinforcing portion connecting both sides of the two first clamping portions, and the second engaging portion may include a second reinforcing portion connecting both sides of the two second clamping portions.

A thickness of each of the body and the holder may be lower than a thickness of a hook hole of a product into which the peg hook is inserted.

A width of each of the body and the holder may be narrower than a width of a hook hole of a product into which the peg hook is inserted.

A total length of the body and the holder in a direction in which the body and the holder may be connected is greater than 1 time and less than 3 times the width of the body.

The body may have a fastening hole formed in the one end portion, and the first engaging portion may include: a first engaging portion having a first curved recess for the engaging hole; and two first clamping portions connected to the first engaging portion, detachably insertedly fixed to the fastening hole, and spaced apart from each other.

A side surface of a connection portion between the first engaging portion and the first clamping portion may be formed parallel to an end side surface of one end portion of the body.

The first engaging portion may have an assembly hole formed between the two first clamping portions, and the second engaging portion includes: a second engaging portion having a second curved recess for the engaging hole; and two second clamping portions connected to the second engaging portion, detachably insertedly fixed to the assembly hole, and spaced apart from each other.

The body may include: a body case in which the holder is provided at one end portion; the display unit provided on a front portion of the body case; a battery disposed inside through an open rear portion of the body case; and a battery case installed on the open rear portion of the body case to cover the battery, wherein the battery case may be formed of a stainless steel material.

The body may further include: a notification lamp formed in the front portion in which the display unit is provided, connected to an application via the wireless Internet, and notifying by emitting light when a displayed product is a product selected from the application.

The display unit may allow a plurality of screens to be switched, and the body may further include: a screen switching button electrically associated with the display unit to change a screen of the display unit.

According to another aspect of the present disclosure, a label apparatus for a peg hook includes: a body including a display unit displaying product information; and a holder detachably provided at one end of the body and including a first engaging portion and a second engaging portion in which one end portions are rotatably connected to each other and the other end portions are attached to each other so that a catching hole is formed therebetween, wherein the body and the holder have a thickness smaller than that of the hook hole of the product into which the peg hook is inserted, and a width narrower than a width of the hook hole.

According to another aspect of the present disclosure, a label apparatus for a peg hook includes: a body including a display unit displaying product information; and a holder detachably provided at one end of the body and including a first engaging portion and a second engaging portion in which one end portions are rotatably connected to each other and the other end portions are attached to each other so that a catching hole is formed therebetween, wherein the body has a fastening hole formed in the one end portion, the first engaging portion includes: a first engaging portion having a first curved recess for the engaging hole; and two first clamping portions connected to the first engaging portion, detachably insertedly fixed to the fastening hole, and spaced apart from each other, the first engaging portion includes an assembly hole formed between the two first clamping portions, and the second engaging portion includes: a second engaging portion having a second curved recess for the engaging hole; and two second clamping portions connected to the second engaging portion, detachably insertedly fixed to the assembly hole, and spaced apart from each other.

The first clamping portion may be insertedly fixed to the fastening hole, a length of the first clamping portion in a direction of insertion with respect to the fastening hole may be longer than a through-length of the fastening hole, the first clamping portion may have a first engaging end formed to be relatively thick outwardly at an end portion, and the first engaging end may be tapered toward an end, the second clamping portion may be insertedly fixed to the assembly hole, a length of the second clamping portion in the insertion direction with respect to the assembly hole may be longer than a through-length of the assembly hole, the second clamping portion may have a second engaging end formed to be relatively thick outwardly at an end portion, and the second engaging end may be tapered toward an end.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
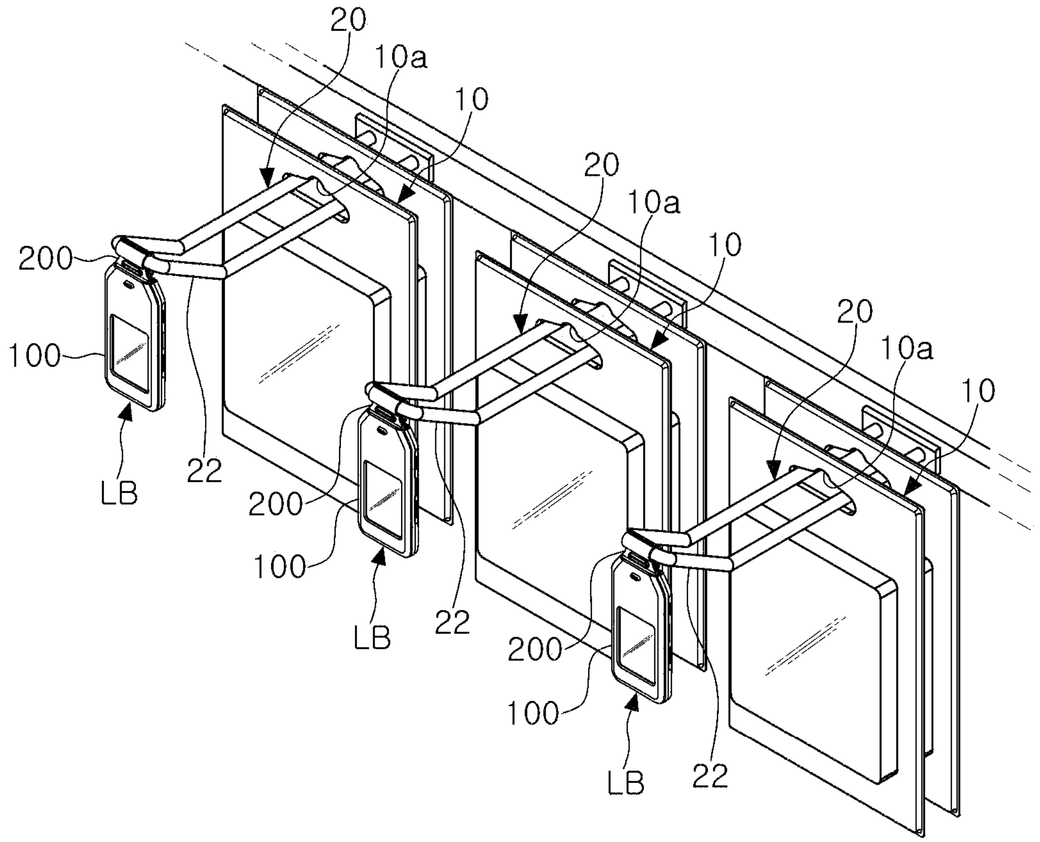
FIG. 1 is a view illustrating that a label apparatus for a peg hook according to an exemplary embodiment in the present disclosure is hung on a peg hook on which a product is hung.
Figure 2:
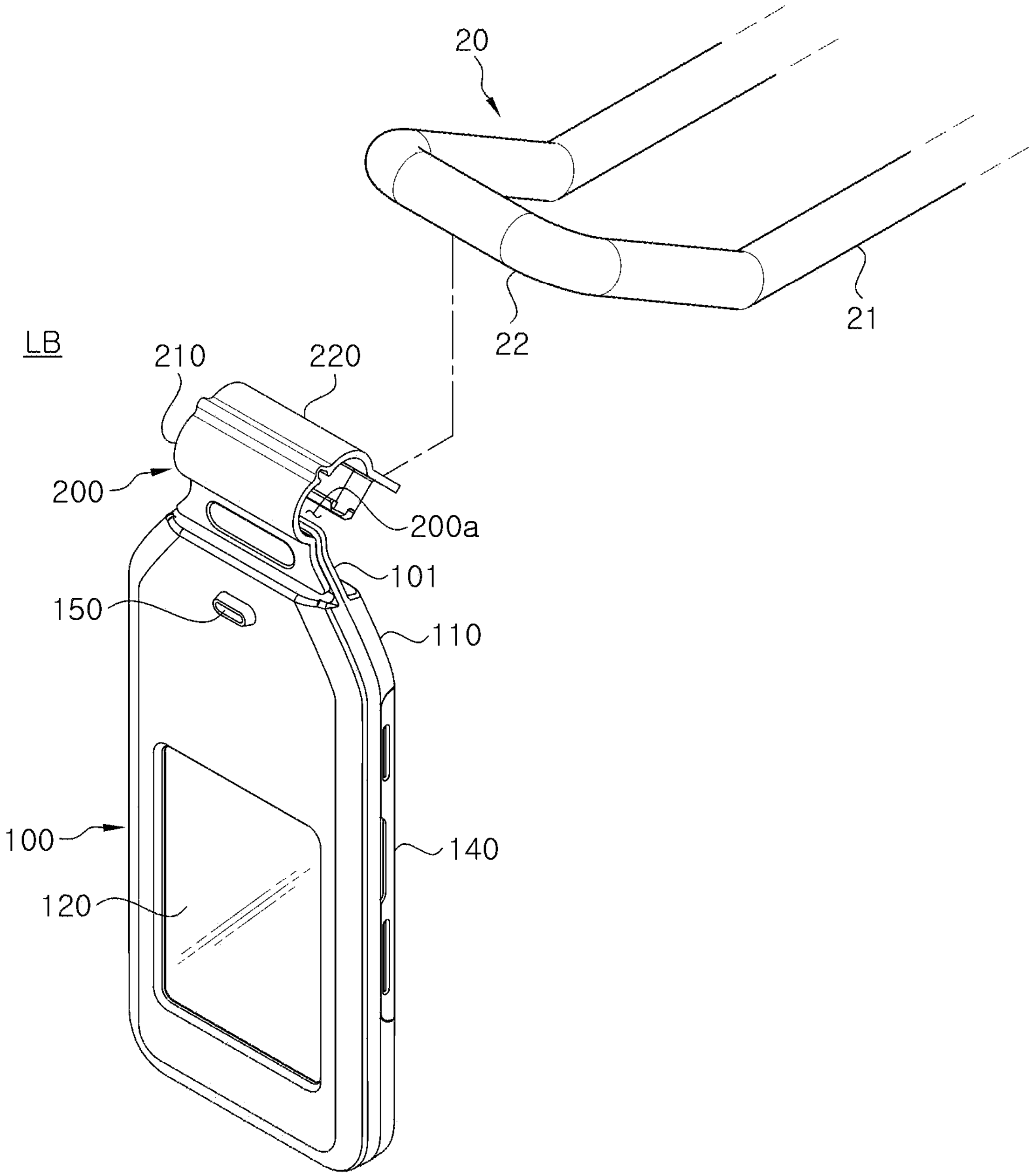
FIG. 2 is an enlarged view of the label apparatus for a peg hook of FIG. 1.

FIG. 1 is a view illustrating that a label apparatus for a peg hook according to an exemplary embodiment in the present disclosure is hung on a peg hook on which a product is hung, and FIG. 2 is an enlarged view of the label apparatus for a peg hook of FIG. 1.

Figure 3:
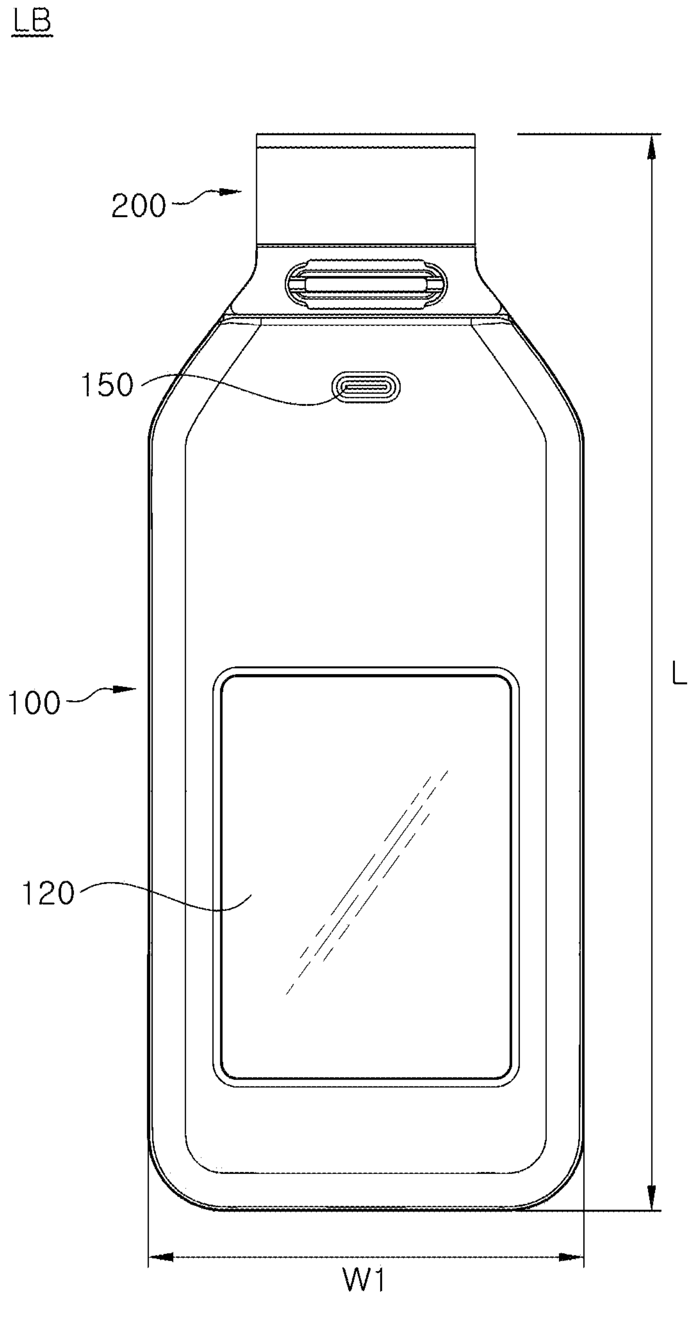
FIGS. 3 and 4 are front and rear views illustrating the label apparatus for a peg hook of FIG. 2.
Figure 4:
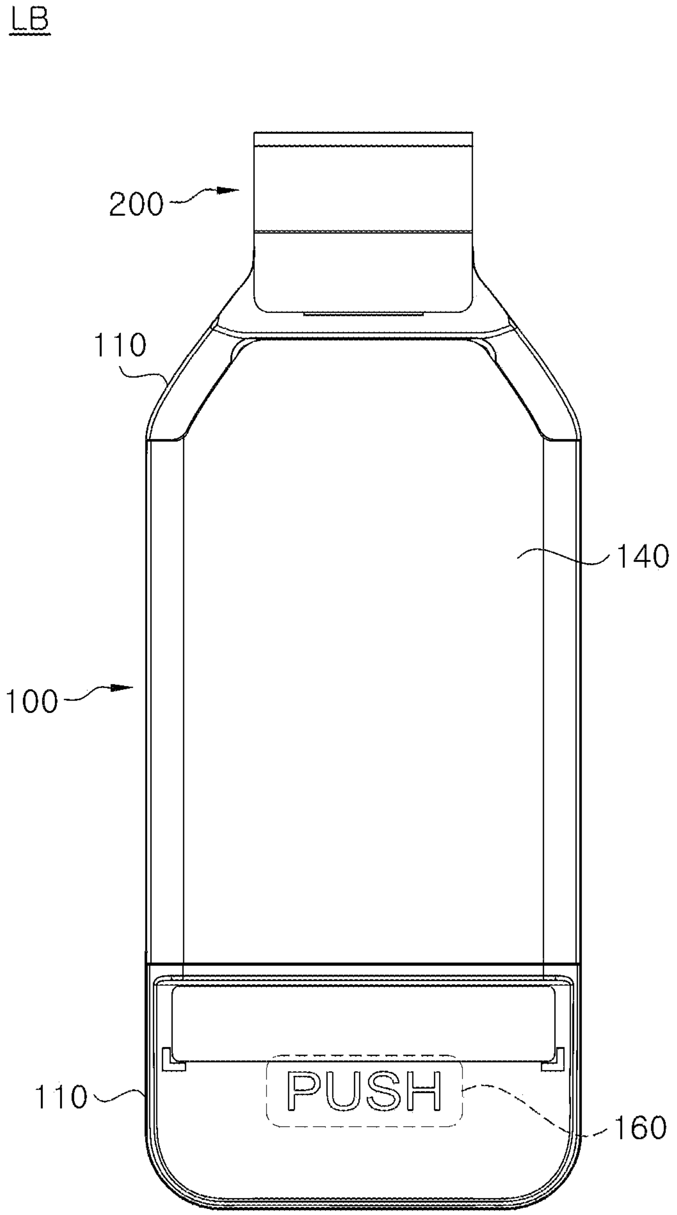
Figure 5:
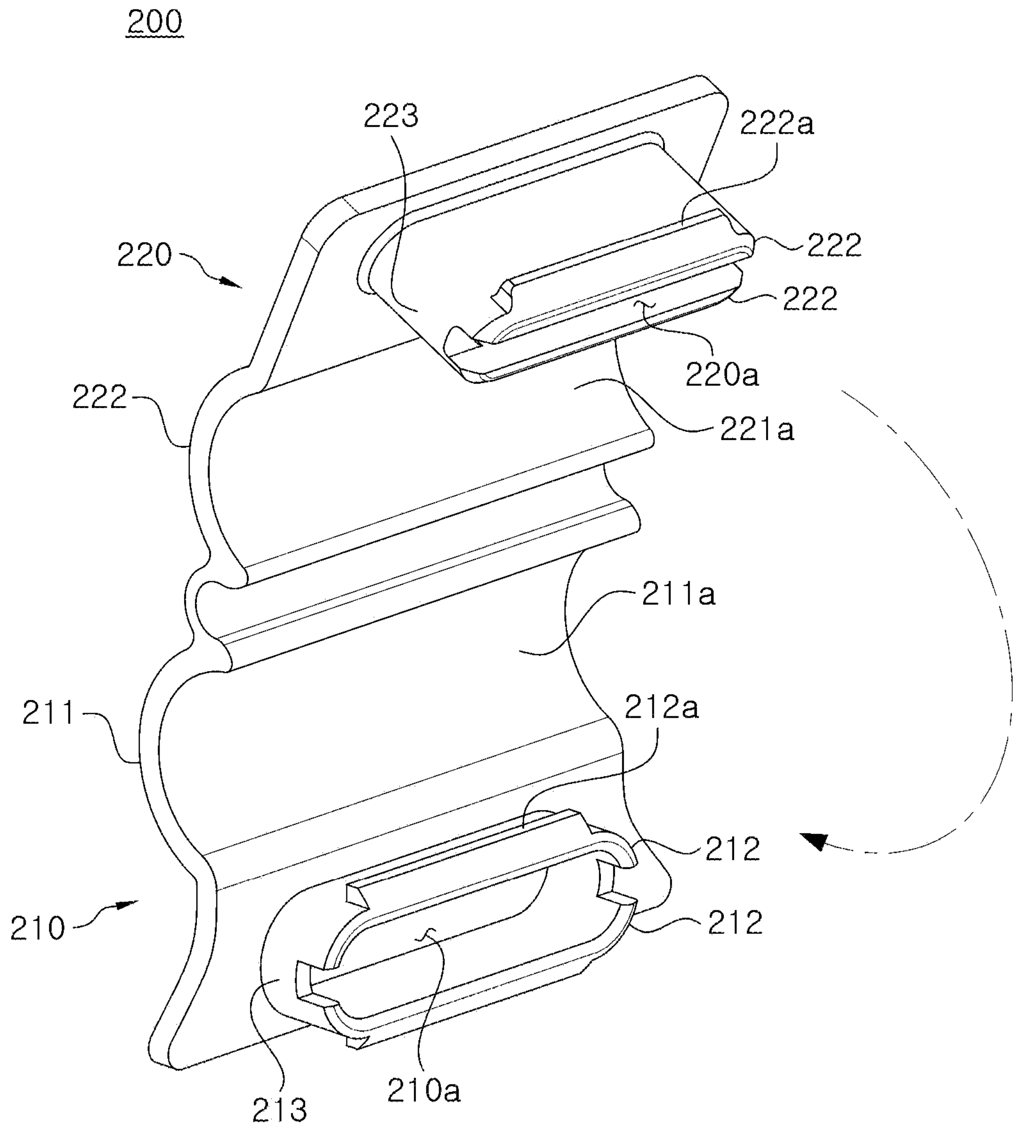
FIGS. 5 and 6 are enlarged views illustrating a holder in the label apparatus for a peg hook of FIG. 2.
Figure 6:
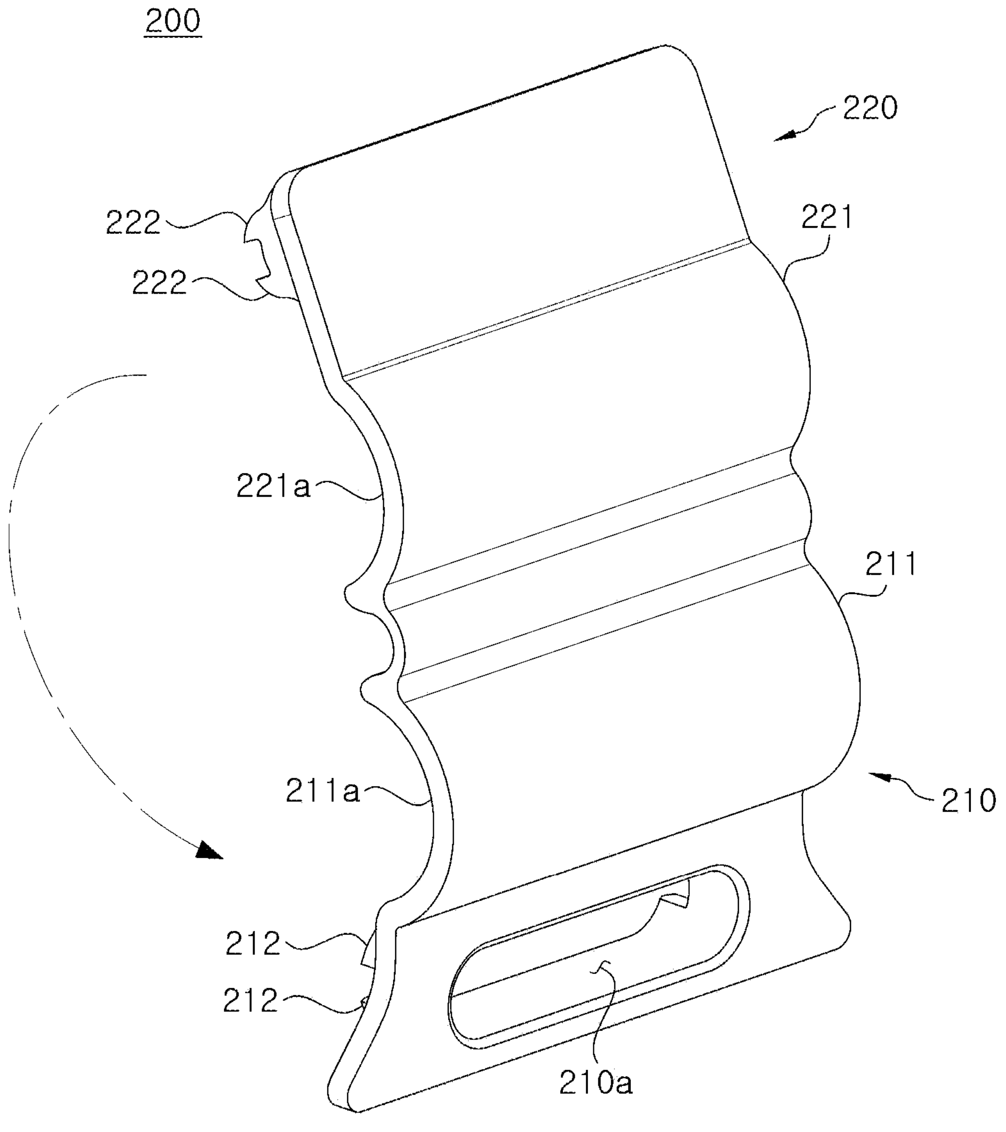

Also, FIGS. 3 and 4 are front and rear views illustrating a label apparatus for a peg hook of FIG. 2, and FIGS. 5 and 6 are enlarged views illustrating a holder in the label apparatus for a peg hook of FIG. 2.

Referring to the drawings, a label apparatus LB for a peg hook according to an exemplary embodiment in the present disclosure includes a body 100 and a holder 200.

The body 100 includes a display unit 120 on which information of a product 10 is displayed. At this time, the display unit 120 is formed on the front side of the body 100, and is a portion in which a name and specific information of the product 10 are electronically displayed.

In addition, the holder 200 is provided at one end portion 101 of the body 100.

Here, one end portion 101 of the body 100 is specifically one end portion 101 of the body case 110, which refers to an upper portion of the body 100 in a state in which the label apparatus LB for a peg hook is caught on the peg hook 20 to be disposed in a longitudinal direction as shown in FIG. 2.

The holder 200 is configured to be caught on an end portion 22 of the peg hook 20.

At this time, the peg hook 20 has a cantilever structure in which one end portion is fixed and the other end portion 22 is not supported, and one end portion is connected and fixed to a wall or a vertically arranged frame (not shown) and the other end portion 22 is not supported by another member.

The end portion 22 of the peg hook 20 described later refers to the other end portion 22 that is not supported by another member, which is first inserted into a hook hole **10*a* of the product 10 to hang the product 10 on the peg hook 20**.

As shown in FIG. 2, the end portion 22 of the peg hook has a U-shape in plan view, has a structure disposed in a transverse direction, and specifically, is bent from the body 21 of the peg hook 20 to be disposed inclined upwardly to a certain extent. That is, the transverse arrangement structure of the end portion 22 of the peg hook 20 is a structure that is substantially slightly inclined upwardly, and the transverse arrangement structure in the present disclosure refers to a laterally extending structure, in abroad sense, including even an inclined structure, except for a vertically arranged structure.

As shown in FIGS. 2 and 5 through 8, the holder 200 is detachably provided in one end portion 101 of the body 100, and includes a first engaging portion 210 and a second engaging portion 220. At this time, the first engaging portion 210 and the second engaging portion 220 are configured to form an engaging hole **200*a* through which the peg hook 20 described above is caught. To this end, one end portions of the first engaging portion 210 and second engaging portion 220** are rotatably connected to each other, and the other end portions are assembled to each other.

The first engaging portion 210 includes a first engaging portion 211 and a first clamping portion 212.

The first engaging portion 211 is formed with a first curved recess **211*a* for the engaging hole 200*a*. The first curved recess 211*a* has a semicircular cross-section or is a recess similar to a semicircular shape. The first curved recess 211*a* is disposed to be adjacent to and facing a second curved recess 221*a* to be described later, and when the first curved recess 211*a* is combined with the second curved recess 221*a*, the engaging hole 200*a*** is formed.

The first clamping portion 212 is connected to the first engaging portion 211, and two first clamping portions 212 are spaced apart from each other to be detachably insertedly fixed to the fastening hole 101*a*. At this time, the fastening hole 101*a* may be formed in one end portion 101 of the body 100, that is, an upper portion of the body 100 as shown in the drawing.

Specifically, a length of the first clamping portion 212 in an insertion direction with respect to the fastening hole 101*a* is longer than a through-length of the fastening hole 101*a*. Here, the first clamping portion 212 may have a first engaging end 212*a* formed to be relatively thick outwardly at an end, and the first engaging end 212*a* may be tapered toward the end.

When the two first clamping portions 212 configured as described above are inserted into the fastening hole 101*a* of the body 100, the two end portions of the two first clamping portions 212 pass through the fastening hole 101*a* to escape outwardly from the fastening hole 101*a*, and at this time, the two end portions of the two first clamping portions 212 are caught on the edge of the fastening hole 101*a* by the two first engaging ends 212*a* formed at the two end portions, thus being clamped.

The first engaging end 212*a* is tapered toward the end, so that when the first clamping portion 212 is inserted into the fastening hole 101*a* of the body 100, the first engaging end 212*a* which is first forcibly inserted may be easily inserted into the fastening hole 101*a*. Conversely, when the first clamping portion 212 is desired to be separated from the one end portion 101 of the body 100, a user may remove the first clamping portion 212 from the fastening hole 101*a*, while pressing the two first engaging ends 212*a* in a direction toward each other.

The first engaging portion 210 may have a first reinforcing portion 213 connecting both sides of the two first clamping portions 212. An assembly hole 210*a* may be formed between the two first clamping portions 212. The assembly hole 210*a* provides a space in which the first clamping portion 212 is slightly bent to enter when the first engaging end 212*a* of the first clamping portion 212 is forcibly inserted into the fastening hole 101*a*. The first reinforcing portion 213 connects both sides of the two first clamping portions 212 to reinforce durability, so that the first clamping portion 212 is not damaged during bending.

A side surface of the connection portion 214 between the first engaging portion 211 and the first clamping portion 212 may be formed parallel to an end side surface 101*b* of the one end portion 101 of the body 100. When the first clamping portion 212 is assembled in the fastening hole 101*a*, the side surface of the connection portion 214 between the first engaging portion 211 and the first clamping portion 212 is adjacent to one end portion 101 of the body 100, that is, the end side surface 101*b* of the upper portion of the body 100 in the drawing. At this time, when the side surface of the connection portion 214 of the first engaging portion 211 and the first clamping portion 212 is formed to be parallel to the end side surface 101*b* of the one end portion 101 of the body 100, the first clamping portion 212 may be firmly fixed to the body 100, and furthermore, the holder 200 may be firmly fixed to the body 100.

Figure 10:
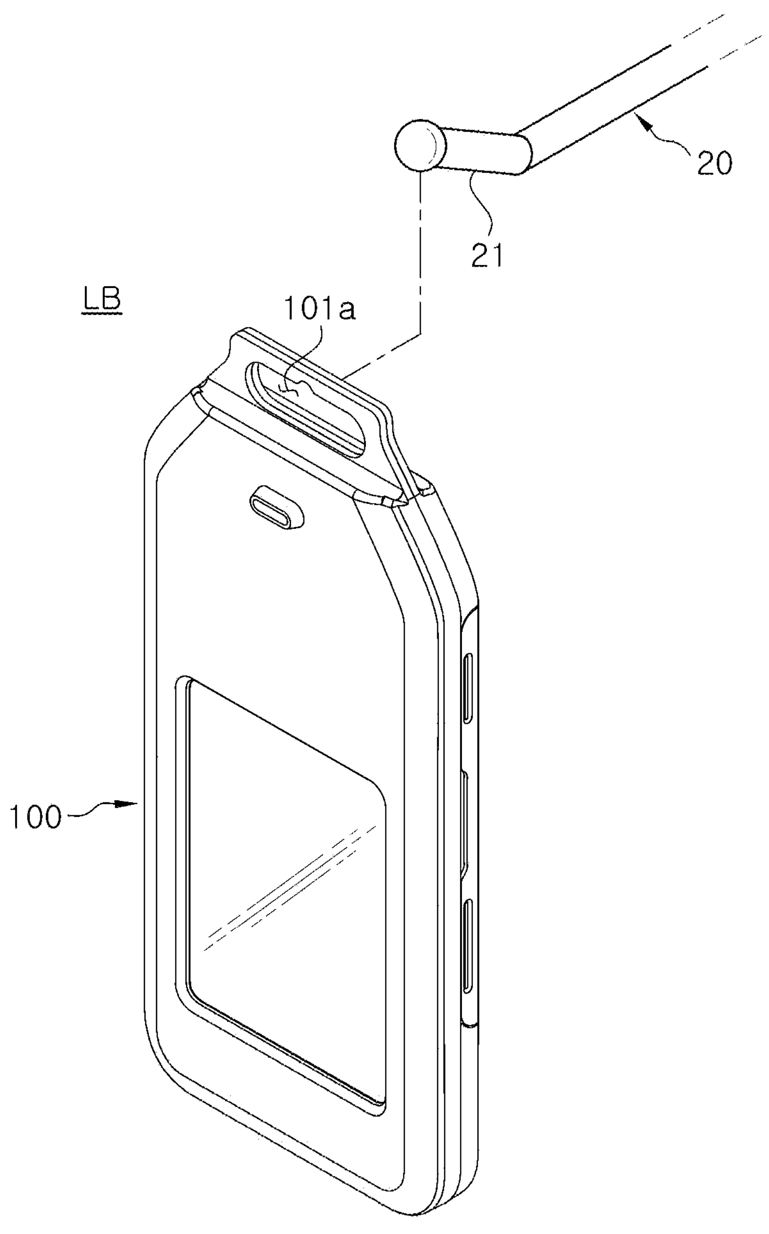
FIG. 10 is a view illustrating a label apparatus for a peg hook according to another exemplary embodiment in the present disclosure.

As described above, in the present disclosure, the first clamping portion 212 of the holder 200 is detachably assembled to the fastening hole 101*a*, so that the holder 200 may be detachably attached to one end portion 101 of the body 100. Due to this, the label apparatus LB for a peg hook according to the present disclosure may be caught on the peg hook 20 by the holder 200 to be used as shown in FIG. 1, or as shown in FIG. 10, only the body 100, without the holder (200 of FIG. 1), may be caught on the peg hook 20 to be used. In the present disclosure, when only the body 100 is used, the end portion 22 of the peg hook having a straight shape may be inserted into the fastening hole 101*a* formed in the body 100 to be caught on the peg hook 20. Furthermore, although not shown in the drawing, when only the body 100 is used, the body 100 may be wound with a string or line through the fastening hole 101*a* to be hung on a product, such as clothes or a bag.

The second engaging portion 220 includes a first engaging portion 221 and a first clamping portion 222.

The second engaging portion 221 includes a second curved recess 221*a* for the engaging hole 200*a*. The second curved recess 221*a* has a semicircular cross-section or a recess similar to a semicircular shape. The second curved recess 221*a* is disposed to be adjacent to and face the first curved recess 211*a*, so that when the second curved recess 221*a* is combined with the first curved recess 211*a*, an engaging hole 200*a* is formed.

The second clamping portion 222 is connected to the second engaging portion 221, and two second clamping portions 222 are spaced apart from each other to be detachably insertedly fixed to the assembly hole 210*a* of the first engaging portion 210.

Specifically, a length of the second clamping portion 222 in an insertion direction with respect to the assembly hole 210*a* is longer than a through-length of the assembly hole 210*a*. Here, the second clamping portion 222 may have a second engaging end 222*a* formed to be relatively thick outwardly at an end portion, and the second engaging end 222*a* may be tapered toward the end.

When the two second clamping portions 222 configured as described above are inserted into the assembly holes 210*a* of the first clamping portions 212, two end portions of the two second clamping portions 222 may pass through the assembly hole 210*a* to escape outwardly from the assembly hole 210*a*, and at this time, the two second clamping portions 222 are engaged with the edge of the assembly hole 210*a* by the two second engaging ends 222*a* formed at the two end portions to be clamped. The second engaging end 222*a* is tapered toward the end, so that when the second clamping portion 222 is inserted into the assembly hole 210*a* of the first clamping portion 212, the second engaging end 222*a* which is first forcibly inserted may be easily inserted into the assembly hole 210*a*. Conversely, when the second clamping portion 222 is desired to be separated from the first clamping portion 212, the user may remove the second clamping portion 222 from the assembly hole 210*a*, while pressing the two second engaging ends 222*a* in a direction toward each other.

The second engaging portion 220 may include a second reinforcing portion 223 connecting both sides of the two second clamping portions 222. An inner recess 220*a* may be formed between the two second clamping portions 222. The inner recess 220*a* provides a space in which the second clamping portion 222 is slightly bent to enter when the second engaging end 222*a* of the second clamping portion 222 is forcibly inserted into the assembly hole 210*a*. The second reinforcing portion 223 connects both sides of the two second clamping portions 222 to reinforce durability, so that the second clamping portion 222 is not damaged during bending.

As described above, in the present disclosure, the second clamping portion 222 is detachably assembled to the first clamping portion 212, so that the end portion 22 of the peg hook may be disposed between the first engaging portion 211 and the second engaging portion 221. That is, after the end portion 22 of the peg hook 20 is disposed in the first curved recess 211*a* of the first engaging portion 211, the second clamping portion 222 is assembled to the first clamping portion 212 so that the second engaging portion 221 covers the first engaging portion 211, and accordingly, as the end portion 22 of the peg hook 20 is disposed between the first curved recess 211*a* of the first engaging portion 211 and the second curved recess 221*a* of the second engaging portion 221, the holder 200 may be caught on the end portion 22 of the peg hook 20.

Figure 9:
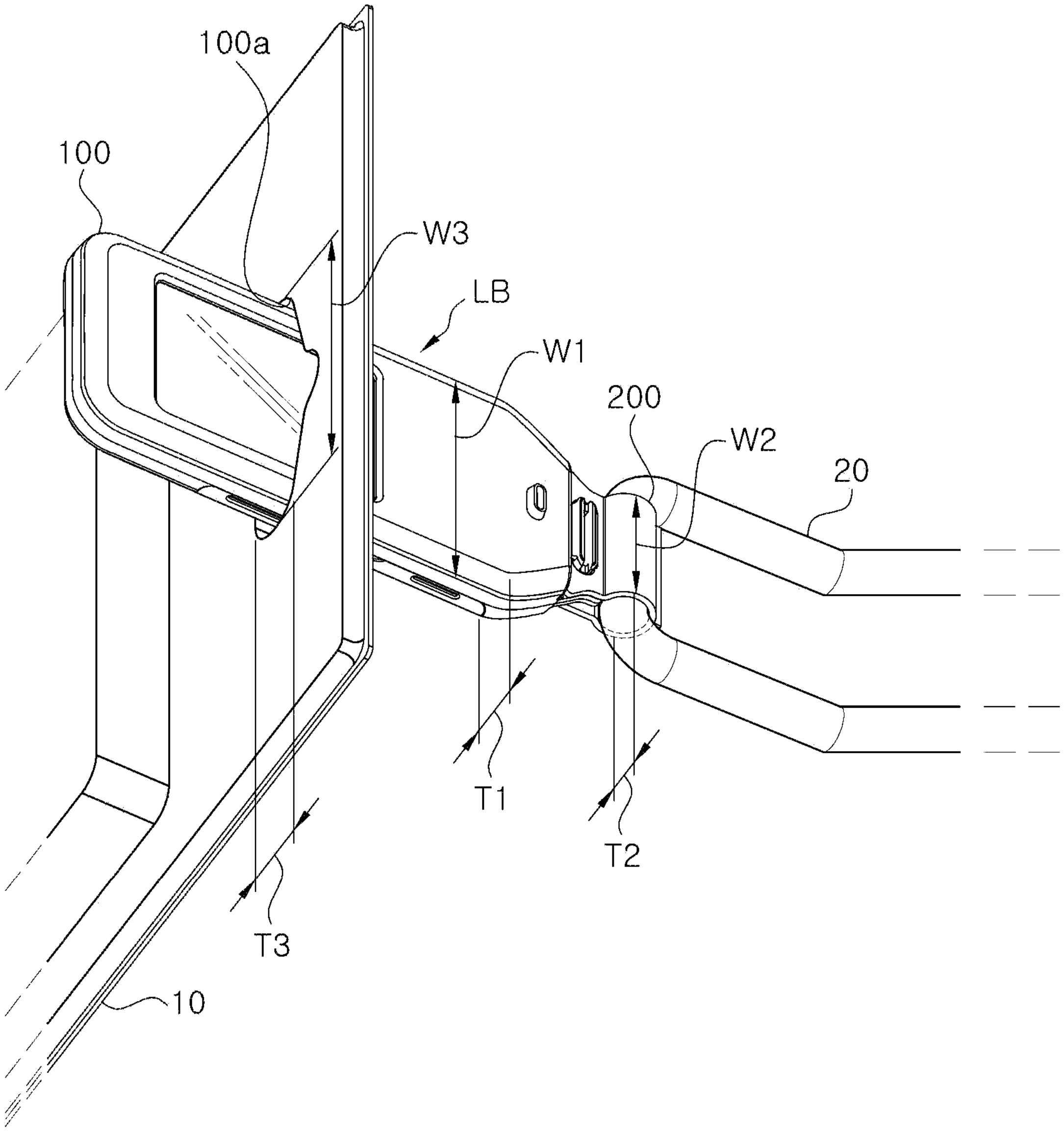
FIG. 9 is a view illustrating that a product moves through the label apparatus for a peg hook of FIG. 2.

Meanwhile, as shown in FIG. 9, in the label apparatus LB for a peg hook according to the present disclosure, thicknesses T1 and T2 of the body 100 and the holder 200 are lower than a thickness T3 of the hook hole 10*a* of the product into which the peg hook 20 is inserted. As the peg hook 20 is inserted into the hook hole 10*a* of the product 10, the product is caught on the peg hook 20. At this time, the thickness T3 of the hook hole 10*a* is greater than the thickness of the peg hook 20, so that the product 10 may easily move along the peg hook 20.

In the present disclosure, since the thicknesses T1 and T2 of the body 100 and the holder 200 are formed to be smaller than the thickness T3 of the hook hole 10*a* described above, the user may grip the product 10 and easily insert the label apparatus LB for a peg hook and the peg hook 20 into the hook hole 10*a* of the product 10 or may grip and easily remove the product 10 from the peg hook 20.

In addition, widths W1 and W2 of the body 100 and the holder 200 are narrower than a width W3 of the hook hole 10*a* of the product 10 into which the peg hook 20 is inserted. As the peg hook 20 is inserted into the hook hole 10*a* of the product 10, the product 10 is caught on the peg hook 20. At this time, since the width W3 of the hook hole 10*a* is greater than the width of the peg hook 20, the product 10 moves easily along the peg hook 20.

In the present disclosure, the widths W1 and W2 of the body 100 and the holder 200 are smaller than the width W3 of the hook hole 10*a* described above, so that the user may grip the product 10 and insert the label apparatus LB for a peg hook and the peg hook 20 into the hook hole 10*a* of the product 10 or may grip the product 10 and easily remove the product 10 from the peg hook 20.

Also, as shown in FIG. 3, a total length L of the body 100 and the holder 200 in a direction in which the body 100 and the holder 200 are connected may be greater than one time and smaller than three times the width W1 of the body 100. If the total length L of the body 100 and the holder 200 is smaller than one time the width W1 of the body 100, the display unit 120 may become too small and information of the product (10 in FIG. 1) may not be sufficiently displayed. In addition, when the total length L of the body 100 and the holder 200 is greater than three times the width W1 of the body 100, the longitudinal length may become too long and the displayed product 10 may be covered so that the product 10 may not be easily identified.

Figure 7:
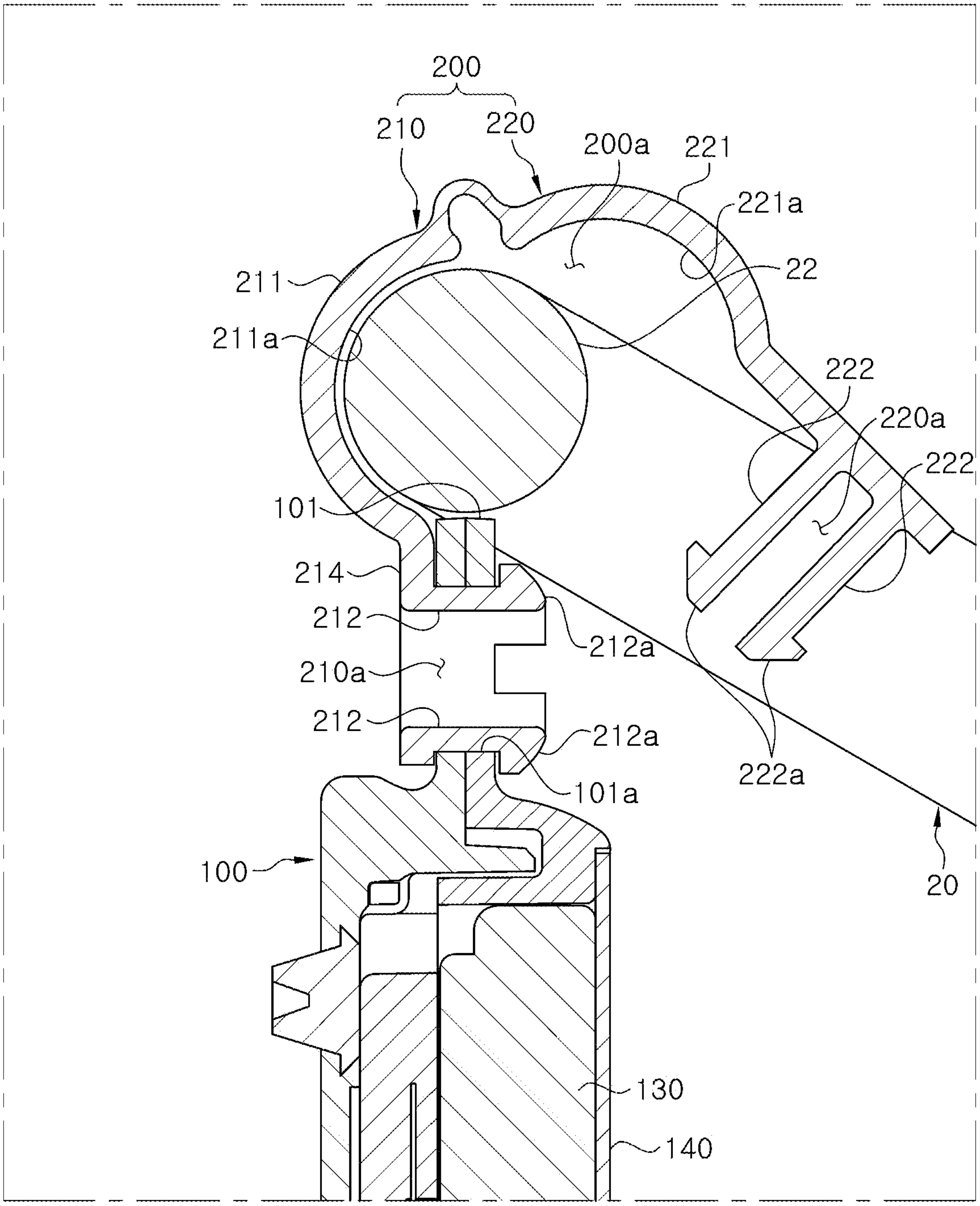
FIGS. 7 and 8 are cross-sectional views illustrating a process in which the peg hook is hung on a holder in the label apparatus for a peg hook of FIG. 2.
Figure 8:
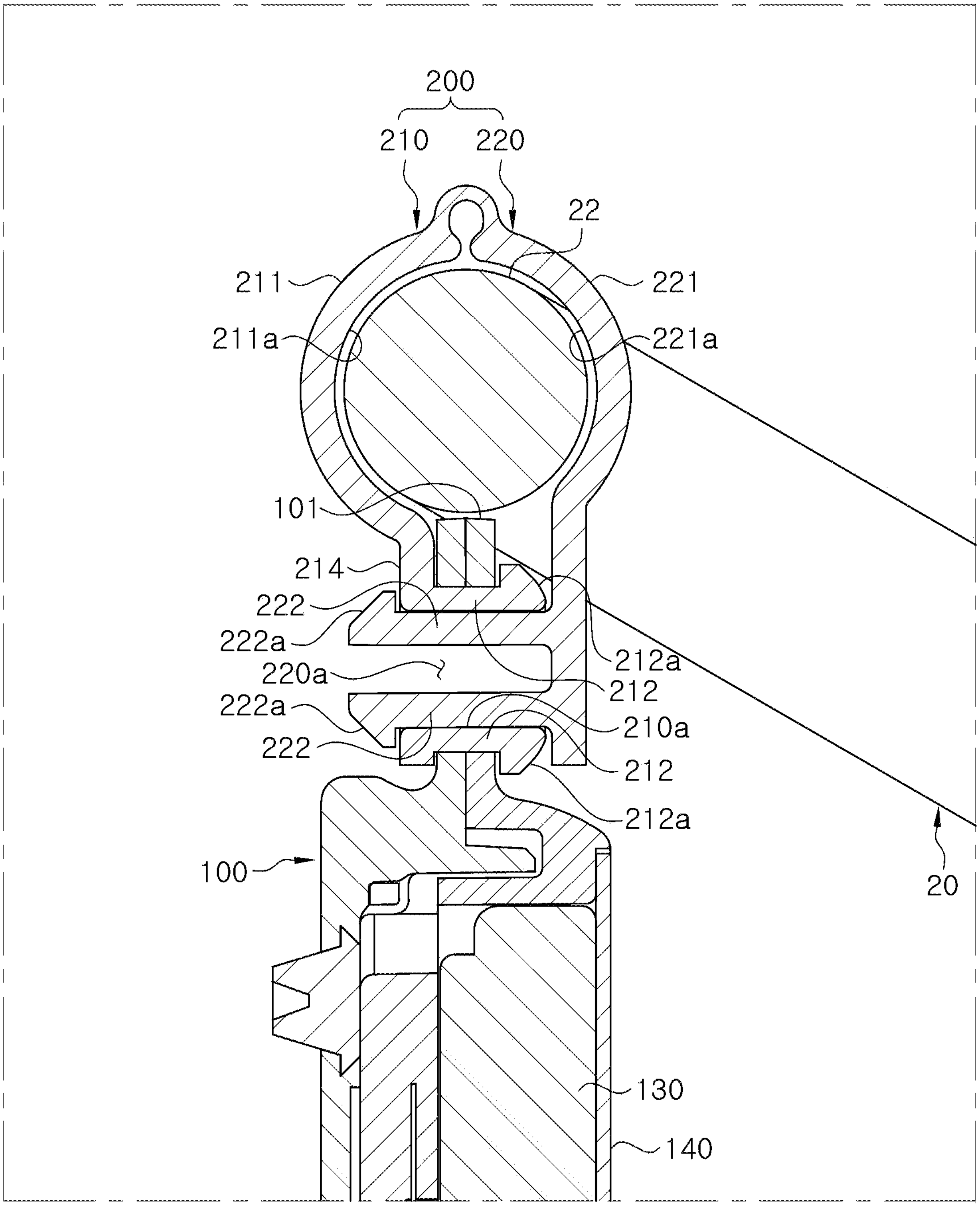

Meanwhile, the body 100 may include a body case 110, the display unit (120 in FIG. 3), a battery 130, and a battery case 140, as shown in FIGS. 4, 7, and 8.

The body case 110 is provided with a holder 200 at one end portion 101, and the display unit 120 is provided on the front portion of the body case 110.

In addition, the battery 130 is disposed inside through an open rear portion of the body case 110, and the battery case 140 is installed on the open rear portion of the body case 110 to cover the battery 130.

At this time, the battery case 140 may be formed of a stainless steel material. As the battery 130 has a thickness greater than or equal to a certain thickness, the battery case 140 needs to be formed to have a very thin thickness in order to reduce the overall thickness of the body 100. To this end, since the battery case 140 is formed of stainless steel, which is a high-strength material, durability may be secured even with a very thin thickness. Furthermore, as the stainless steel material has excellent corrosion resistance, the battery case 140 is not easily oxidized.

Meanwhile, the present disclosure may further include a notification lamp 150 as shown in FIGS. 2 and 3.

The notification lamp 150 is formed on a front portion of the body 100 in which the display unit 120 is formed, and is connected to an application through the wireless Internet.

The notification lamp 150 plays a role of notifying by light emission when the product (10 in FIG. 1) displayed on the peg hook 20 is the product 10 selected in the application.

Also, in the present disclosure, as shown in FIG. 4, a screen switching button 160 may be formed.

The display unit (120 in FIG. 3) is configured to be able to switch a plurality of screens, and the screen switch button 160 may be formed to operate the screen switching.

Specifically, the screen switching button 160 is formed on a rear portion of the display unit 120 in the body 100, and has a structure electrically connected to the display unit 120 to switch the screen of the display unit 120.

Furthermore, this screen switching button 160 may be formed of a built-in structure not to protrude to the outside of the body 100, and in this case, when a portion of an outer surface of the body 100 corresponding to the screen switching button 160, that is, a portion marked 'push' in the drawing, is pressed, the internal screen switching button 160 may be pressed.

The label apparatus for a peg hook according to the present disclosure has an effect that the holder is detachably provided at one end portion of the body, so that the label apparatus for a peg hook may be caught on the peg hook by the holder to be used, or only the body, without a holder, may be caught on the peg hook to be used.

In addition, in the present disclosure, the thickness of each of the body and the holder is formed smaller than the thickness of the hook hole and the width is formed smaller than the width of the hook hole, so that the user may grip the product and easily insert the label apparatus for a peg hook of the present disclosure and the peg hook into the hook hole of the product, or the user may grip the product and easily remove the product from the peg hook.

In addition, according to the present disclosure, as the total length of the body and the holder is greater than one time and less than 3 times the width of the body, covering the displayed product may be minimized, while securing the display unit having an appropriate size, so that the product may be easily identified.

On the other hand, in the present disclosure, since the battery case is formed of stainless steel, the durability may be secured even with a very thin thickness and, since corrosion resistance is excellent, oxidation of the battery case may be prevented.

While exemplary embodiments have been shown and described above, it will be apparent to those skilled in the art that modifications and variations could be made without departing from the scope of the present disclosure as defined by the appended claims.

What is claimed is:

1. A label apparatus for a peg hook, the label apparatus comprising:

a body including a display unit displaying product information; and a holder detachably provided at one end of the body and including a first engaging portion and a second engaging portion in which one end portions of the first engaging portion and second engaging portion are rotatably connected to each other and the other end portions of the first engaging portion and second engaging portion are attached to each other so that a catching hole is formed therebetween, wherein the body has a fastening hole formed in one end portion of the body, and the first engaging portion includes two first clamping portions detachably insertedly fixed to the fastening hole and spaced apart from each other.

2. The label apparatus of claim 1, wherein a length of the two first clamping portions in a direction of insertion with respect to the fastening hole is longer than a through-length of the fastening hole, the two first clamping portions have a first engaging end formed to be relatively thick outwardly at an end portion of the two first clamping portions, and the first engaging end is tapered toward an end.

3. The label apparatus of claim 1, wherein an assembly hole is formed between the two first clamping portions, and the second engaging portion is formed with two second clamping portions spaced apart from each other and detachably insertedly fixed to the assembly hole.

4. The label apparatus of claim 3, wherein a length of the two second clamping portions in a direction of insertion with respect to the assembly hole is longer than a through-length of the assembly hole, the second clamping portions have a second engaging end formed to be relatively thick outwardly at an end portion of the second clamping portions, and the second engaging end is tapered toward an end.

5. The label apparatus of claim 3, wherein the first engaging portion includes a first reinforcing portion connecting both sides of the two first clamping portions, and the second engaging portion includes a second reinforcing portion connecting both sides of the two second clamping portions.

6. The label apparatus of claim 1, wherein a total length of the body and the holder in a direction in which the body and the holder are connected is greater than 1 time and less than 3 times the width of the body.

7. The label apparatus of claim 1, wherein the first engaging portion includes:

a first curved recess for forming an engaging hole; and wherein the two first clamping portions are connected to the first engaging portion, are detachably insertedly fixed to the fastening hole, and are spaced apart from each other.

8. The label apparatus of claim 7, wherein a side surface of a connection portion between the first engaging portion and the first clamping portion is formed parallel to an end side surface of the one end portion of the body.

9. The label apparatus of claim 7, wherein the first engaging portion has an assembly hole formed between the two first clamping portions, and the second engaging portion includes:

a second engaging portion having a second curved recess for forming the engaging hole; and two second clamping portions connected to the second engaging portion, detachably insertedly fixed to the assembly hole, and spaced apart from each other.

10. The label apparatus of claim 1, wherein the body includes:

a body case in which the holder is provided at one end portion;

the display unit provided on a front portion of the body case;

a battery disposed inside through an open rear portion of the body case; and a battery case installed on the open rear portion of the body case to cover the battery, wherein the battery case is formed of a stainless steel material.

11. The label apparatus of claim 1, wherein the body further includes:

a notification lamp formed in a front portion in which the display unit is provided, and connected to an application via a wireless Internet, and notifying by emitting light when a displayed product is a product selected from the application.

12. The label apparatus of claim 1, wherein the display unit allows a plurality of screens to be switched, and the body further includes a screen switching button electrically associated with the display unit to change a screen of the display unit.

13. A label apparatus for a peg hook, the label apparatus for a peg hook comprising:

a body including a display unit, the display unit being configured to display product information; and a holder detachably provided at one end of the body and including a first engaging portion and a second engaging portion in which respective first end portions of the first engaging portion and second engaging portion are rotatably connected to each other and respective second end portions of the first engaging portion and second engaging portion are attached to each other so that a catching hole is formed therebetween, wherein the body and the holder have a thickness smaller than that of a hook hole of a product into which the peg hook is inserted, and a width narrower than a width of the hook hole, wherein the body has a fastening hole formed in one end portion of the body, and the first engaging portion includes two first clamping portions detachably insertedly fixed to the fastening hole and spaced apart from each other.

14. The label apparatus of claim 13, wherein a length of the two first clamping portions in a direction of insertion with respect to the fastening hole is longer than a through-length of the fastening hole, the two first clamping portions have a first engaging end formed to be relatively thick outwardly at an end portion of the two first clamping portions, and the first engaging end is tapered toward an end.

15. The label apparatus of claim 14, wherein an assembly hole is formed in the first clamping portion, and the second engaging portion includes two second clamping portions spaced apart from each other and detachably insertedly fixed to the assembly hole, a length of the two second clamping portions in a direction of insertion with respect to the assembly hole is longer than a through-length of the assembly hole, the two second clamping portions have a second engaging end formed to be relatively thick outwardly at an end portion of the two second clamping portions, and the second engaging end is tapered toward an end.

16. A label apparatus for a peg hook, the label apparatus comprising:

a body including a display unit displaying product information; and a holder detachably provided at one end of the body and including a first engaging portion and a second engaging portion in which respective first end portions of the first engaging portion and second engaging portion are rotatably connected to each other and respective second end portions of the first engaging portion and second engaging portion are attached to each other so that a catching hole is formed therebetween, wherein the body has a fastening hole formed in the one end portion, the first engaging portion includes:

a first curved recess for forming an engaging hole; and two first clamping portions connected to the first engaging portion, detachably insertedly fixed to the fastening hole, and spaced apart from each other, the first engaging portion includes an assembly hole formed between the two first clamping portions, and the second engaging portion includes:

a second curved recess for forming an engaging hole; and two second clamping portions connected to the second engaging portion, detachably insertedly fixed to the assembly hole, and spaced apart from each other.

17. The label apparatus of claim 16, wherein the first clamping portion is insertedly fixed to the fastening hole, a length of the two first clamping portions in a direction of insertion with respect to the fastening hole is longer than a through-length of the fastening hole, the first two clamping portion have a first engaging end formed to be relatively thick outwardly at an end portion of the two first clamping portions, and the first engaging end is tapered toward an end, the two second clamping portions are insertedly fixed to the assembly hole, a length of the two second clamping portions in a direction of insertion with respect to the assembly hole is longer than a through-length of the assembly hole, the two second clamping portions have a second engaging end formed to be relatively thick outwardly at an end portion of the two second clamping portions, and the second engaging end is tapered toward an end.

* * * * *